United States Patent
Ashiya

[15] 3,663,875
[45] May 16, 1972

[54] CONTROL SYSTEM FOR ELECTRIC VEHICLES

[72] Inventor: Masahiro Ashiya, Amagasaki, Japan
[73] Assignee: Mitsubishi Denki Kabushiki Kaisha, Tokyo, Japan
[22] Filed: Jan. 26, 1970
[21] Appl. No.: 5,814

[30] Foreign Application Priority Data

Jan. 30, 1969 Japan..................................44/6900

[52] U.S. Cl..............................................318/52, 318/71
[51] Int. Cl. ............................................................H02p 5/50
[58] Field of Search...................318/52, 71, 80, 82, 104, 113

[56] References Cited

UNITED STATES PATENTS

| | | | |
|---|---|---|---|
| 2,197,643 | 4/1940 | Konn | 318/52 |
| 2,313,503 | 3/1943 | Baldwin | 318/52 X |
| 3,378,743 | 4/1968 | Weiser | 318/52 |

Primary Examiner—Bernard A. Gilheany
Assistant Examiner—W. E. Duncanson, Jr.
Attorney—Robert E. Burns and Emmanuel J. Lobato

[57] ABSTRACT

Four DC traction motors are serially connected to one another and divided into two groups. Upon the occurrence of a slip, a difference between voltages across the two motor groups is detected and applied to a current regulator along with a current flowing through the motors and a current pattern for normally determining that current. Then a magnitude of current fed back to the motor current is determined and the motor current decreases until the slip terminates. After the slip has terminated, the normal operation is performed.

3 Claims, 5 Drawing Figures

Patented May 16, 1972

CONTROL SYSTEM FOR ELECTRIC VEHICLES

BACKGROUND OF THE INVENTION

This invention relates to a control system for a train of electric vehicles including plural sets of traction motors supplied with a direct current power.

In trains of electric vehicles driven with the direct current power supplied either directly by the associated direct current feeder line or supplied by rectifier means equipped thereon and fed by the associated alternating current feeder line to convert the supplied alternating current power to a direct current power, the control of direct current traction motors equipped thereon is generally accomplished by power conversion means involved for continuously controlling the direct current voltage. Upon accelerating and decelerating such electric trains the particular magnitude to which the current flowing through the traction motors be limited has heretofore determined by the adhesion coefficient of the train under the worst track conditions. Then that adhesion coefficient has a magnitude much dependent upon the track conditions such as the dryness or wetness of the rail etc. Further, due of the properties of the electric vehicles, it is an important problem to determine that value of the adhesion coefficient corresponding to the worst track conditions, which value determines the current limiting magnitude as above described. However there is normally no alternative but to impart a very great allowance to the current limiting magnitude while there is a very little opportunity of actually encountering the worst track conditions.

If a slip has occurred in operation it has been previously practiced that once the slip speed has exceeded a predetermined magnitude a line switch involved is open to put the power running mode of operation in the OFF state thereby to wait for the slip to terminate. Then after the slip has terminated, the line switch has been again closed. In other words, the occurrence of a slip in the operation of a train of electric vehicles has caused the acceleration and motor speed thereof to reduce once to zero magnitude. This has led to a decrease in acceleration and hence to an increase in variation thereof. Thus the prior art type controls have been disadvantageous in that the passengers have felt very great shocks.

SUMMARY OF THE INVENTION

Accordingly it is an object of the invention to provide a new and improved control system for a train of electric vehicles driven with a direct current power, which system eliminates the abovementioned disadvantage of the prior art type control systems and is enabled to utilize the coefficients of friction between the wheels thereof and the associated rails as much as possible.

The invention accomplishes this object by the provision of a control system for use with a train of electric vehicles including a plurality of direct current motors energized and controlled either directly with a direct current power itself applied thereto or with a direct current power provided through the rectification of an alternating current power applied thereto, characterized by means for detecting a slip of a particular wheel of the vehicle, and means for controlling a current flowing through the direct current motors in accordance with the detected magnitude of the slip.

The means for detecting the slip may be preferably operated to detect at least one of a difference between voltages across the direct current motors and a difference in the number of revolution between the direct current motors and a difference in the number of revolution between the wheels of the vehicles.

In a preferred embodiment of the invention the control system may comprise a plurality of direct current traction motors serially connected to one another and divided into two motor groups, one detection means operatively coupled to said two motor groups to detect a difference in a quantity relating to a slip of the train between said two motor groups, a current detector means for detecting a current flowing through said traction motors, a current pattern for determining a magnitude to which the current flowing through the traction motors are normally limited, and means applied with the output from said detection means, the output from said current detector means and said current pattern to provide an output serving to decrease the current flowing through said traction motors as a function of the particular slip speed.

BRIEF DESCRIPTION OF THE DRAWINGS

The invention will become more readily apparent from the following detailed description taken in conjunction with the accompanying drawings in which.

DESCRIPTION OF THE PREFERRED EMBODIMENTS

Figure 1:
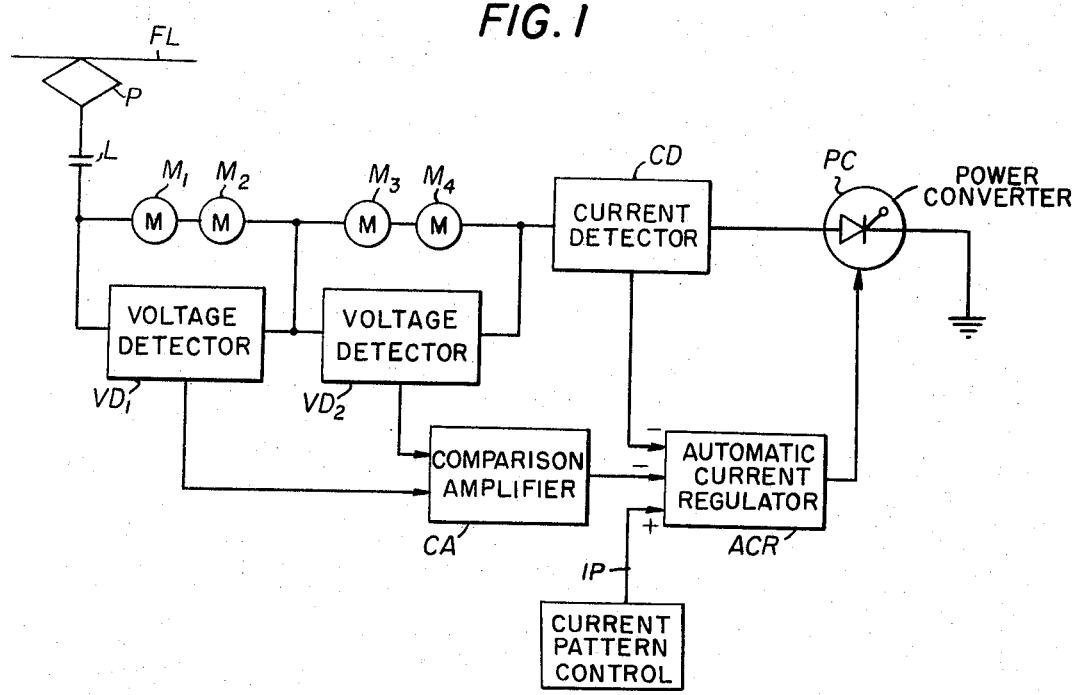
FIG. 1 is a block diagram of a control system for a train of electric vehicles constructed in accordance with the principles of the invention.

Referring now to the drawings and FIG. 1 in particular, there is illustrated a control system for a train of electric vehicles constructed in accordance with the principles of the invention. The arrangement illustrated comprises a pantograph P put in sliding contact with a feeder line FL, a master circuit switch L connected to the pantograph P to connect and disconnect the main circuit to and from the feeder line FL, and a plurality, in this case four, direct current (DC) traction motors $M_1$, $M_2$, $M_3$ and $M_4$ serially connected to one another. A first one of the motors $M_1$ is connected to the line circuit switch L while the last or fourth motor $M_4$ is connected to a current detector CD for detecting a current flowing through the serially connected DC motors $M_1$, $M_2$, $M_3$ and $M_4$. Then the current detector CD is connected to a DC power converter PC shown as being a thyristor chopper connected to a return line symbolically designated by the symbol "ground." The power converter CP serves to intermittently pass the current therethrough to continuously control the magnitude of current as a whole. If desired, the converter may be formed of any suitable voltage control devices other than the thyristor chopper as illustrated in FIG. 1. The motors, the current detector and the power converter as above described constitutes the abovementioned main circuit for the train.

In order to detect the voltages across the traction, motors, a pair of voltage detectors $VD_1$, and $VD_2$ are connected to each pair of serially connected motors $M_1$ and $M_2$ and $M_3$ and $M_4$ to detect the voltages across the two associated motors respectively. The outputs from the voltage detectors $VD_1$ and $VD_2$ are applied to a voltage comparison device CA where both the outputs are compared with each other. The comparison device is essentially an amplifier operative to take up a difference between both the outputs from the voltage detectors as a result of the comparison and to provide a suitable current limiting magnitude converted from the voltage difference for the purpose of terminating a slip of a vehicle's wheel. In order that a magnitude to which a current flowing through the serially connected traction motors is limited is controlled to a predetermined magnitude, there is provided an automatic constant-current regulator ACR having applied to its inputs the output from the comparison amplifier CA, the output from the current detector CD and the output of control means providing a current pattern IP for normally determining the current flowing through the motors $M_1$ through $M_4$. It is noted that the current pattern IP is manually applied to the regulator ACR by the operator and opposite in polarity to the outputs from both the current detector CD and the amplifier CA. Thus FIG. 1 shows that the regulator ACR has applied to its inputs the current pattern IP with the positive polarity, and the outputs from the detector and amplifier with the negative polarity. The automatic constant-current regulator ACR is operative to compare one input or the current pattern IP with the two remaining inputs to provide an output which is, in turn, fed back as a firing signal to the DC power converter PC.

It is now assumed in FIG. 1 that the feeder line FL supplies a predetermined constant voltage of direct current to the above-mentioned main circuit through the pantograph P. Under the assumed condition, the power converter PC is operated to supply to the traction motors $M_1$ through $M_4$ DC powers in accordance with the reverse electromotive forces of the motors respectively while the automatic constant-current regulator ACR controls the current flowing through the serially connected motors $M_1$ through $M_4$ to a predetermined fixed magnitude. In other words, if no slip occurs, the amplifier CA provides a null output and therefore the regulator ACR responds to a difference between the current pattern IP and the output from the current detector CD to maintain the motor current at a predetermined fixed magnitude.

On the other hand, if a slip occurs, that traction motor operatively coupled with the particular slipping axle (not shown) increases in voltage thereacross as compared with the remaining motors, resulting in a difference between the outputs from the voltage detectors $VD_1$ and $VD_2$. Then the amplifier CA has applied, as one input, thereto a voltage corresponding to that difference between the outputs from both the voltage detectors.

Figure 3:
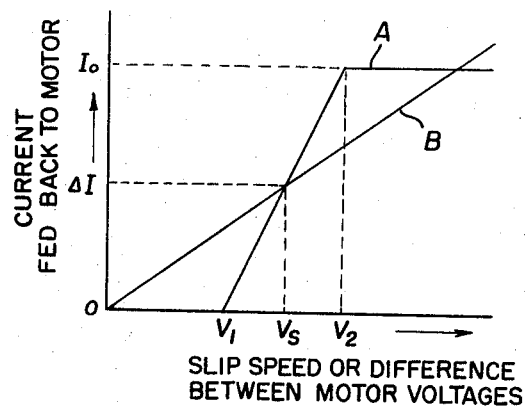
FIG. 3 is a graphic representation of the operational characteristics of the invention.

The amplifier CA is adapted to respond to the voltage difference as above described to exhibit the output characteristic as shown in FIG. 3 wherein the axis of abscissas represents a slip speed or the corresponding voltage difference between the traction motors and the axis of ordinates represents an output from the regulator ACR fed back to the power converter CP as shown in FIG. 1. In FIG. 3, curve A designates, by way of example, an output characteristic provided by one embodiment of the invention. As shown at curve A, a magntidue of current fed back to the current flowing through the traction motors is null for a slip speed of from 0 to a magnitude corresponding to a predetermined voltage difference of $V_1$, while it increases in proportion to the slip speed when the speed ranges from $V_1$ to another predetermined voltage difference of $V_2$. For the slip speed above $V_2$, the amplifier CA provides, as its output, a predetermined constant magnitude of current fed back to the motor current which is, in turn, equal to a predetermined magnitude $I_0$ to which the current flowing through the motors is limited in the absence of any slip. That constant magnitude of current is fed back to the motor current to render the actual current flowing through the motor null.

Curve B shown in FIG. 3 represents output characteristic provided by another embodiment of the invention and shows that a magnitude of current fed back to the current flowing through the motors increases in proportion to the slip speed or the voltage difference increased from a zero magnitude.

With the amplifier CA having applied thereto a voltage corresponding to a difference in output voltage between the voltage dividers $VD_1$ and $VD_2$, it provides a magnitude of current fed back to the motor current determined as a function of the particular slip speed in accordance with either of the output characteristics A or B as shown in FIG. 3. Then a signal corresponding to the magnitude of current thus determined is supplied to the automatic constant-current regulator ACR which, in turn, operates the power converter PC to decrease the current flowing through the motors in accordance with the magnitude of current fed back to the motor current. In this way the current flowing through the traction motors decreases to its magnitude with which the adhesion is restored, whereupon the amplifier CA becomes low in output and soon provides a null output whereby the current limiting magnitude is returned back to its original one.

Thus it will be appreciated that if the amplifier CA is properly designed to have its output characteristic such as shown at curve A or B that the adhesion can be restored while the slip speed is still low. In that event, if the output characteristic of the amplifier CA is selected to render the slip speed substantially null then the train of electric vehicles can be operated with the current limiting magnitude utilizing the coefficient of adhesion as much as possible.

As above described, the amplifier CA has its output characteristic by which a magnitude of current fed back to the motor current is determined as function of the slip speed. This permits a maximum magnitude of the slip speed to much decrease which will be subsequently described in conjunction with FIGS. 4 and 5.

Figure 4:
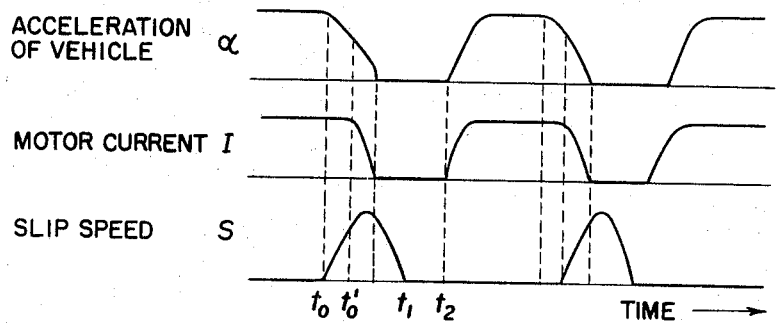
FIG. 4 is a graph representing the result of control effected by the prior art type of control systems.

FIG. 4 illustrates waveforms of an acceleration $\alpha$ of a train of electric vehicles, a motor current I and a slip speed S developed in a control system of the prior art type. As shown in FIG. 4, if a slip occurred at a time point of $t_0$, then the train immediately begins to decrease in acceleration but the motor current begins to reduce with a time delay of $(t_0' - t_0)$. Then the acceleration and the motor current decrease to zero magnitude while the slip speed increases to its maximum magnitude and then reaches its zero magnitude at a time point of $t_1$. Thereafter a second slip will occurs at a time point of $t_2$ and the process as above described is repeated. In other words, once a slip has occurred, the acceleration and motor current decrease once to zero magnitude. This causes the acceleration to become low in magnitude but to become large in variation with the result that the shocks due to the slip is greate.

Figure 5:
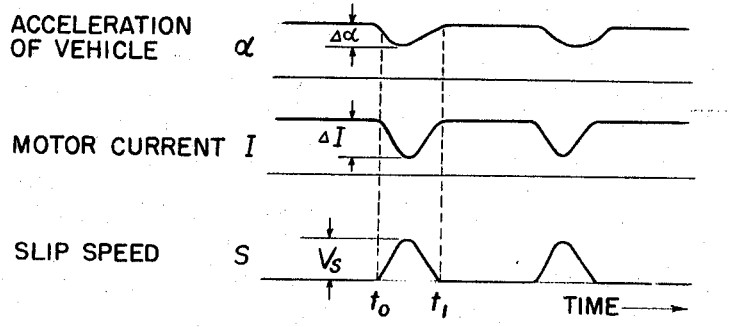
FIG. 5 is a graph representing the result provided by the control system of the invention.

However, according to the invention the occurrence of a slip at a time point of $t_0$ causes the amplifier CA to immediately decrease the acceleration $\alpha$ and the motor current I without any appreciable time delay, as shown in FIG. 5. That is, the corresponding slip speed of Vs causes both the acceleration $\alpha$ and the motor current I to be immediately decreased by amounts of $\Delta\alpha$ and $\Delta I$ respectively. Then at a time point of $t_1$ the slip terminates to restore the adhesion while at the same time, the acceleration and the motor current are returned back to their original magnitudes resulting in the normal operation. In other words, the occurrence of a slip causes the acceleration to change by a small amount of $\Delta\alpha$ and permits the adhesion to be rapidly restored without the acceleration and motor current reaching zero magnitude. Therefore the train can be smoothly operated without any shock.

Figure 2:
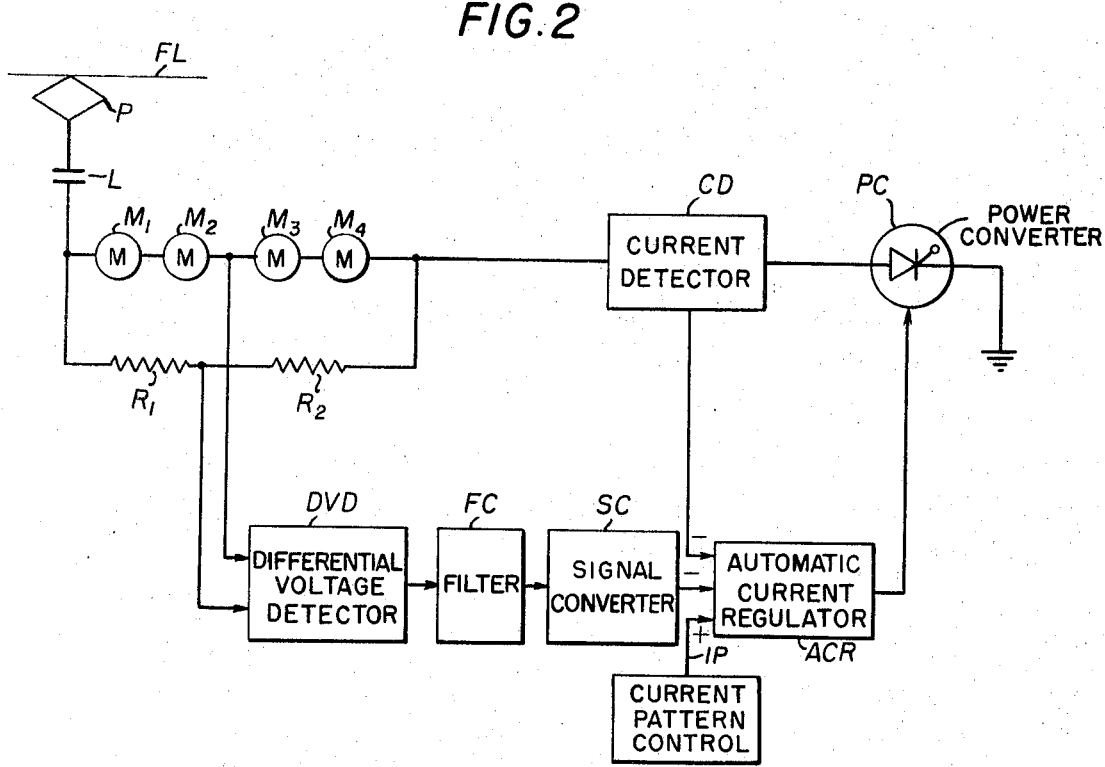
FIG. 2 is a view similar to FIG. 1 but illustrating a modification of the invention.

FIG. 2 wherein like reference characters designate the components corresponding or identical to those shown in FIG. 1 illustrates a modification of the invention. A pair of resistors $R_1$ and $R_2$ are connected in series circuit relationship across the series combination of four traction motors $M_1$ through $M_4$ to form a Wheatstone bridge. The bridge has a terminal at the junction of the second and third motors $M_2$ and $M_3$ and another terminal at the junction of the resistors $R_1$ and $R_2$ and is operative to detect a difference in voltage between the motors in one arm thereof and those in the other arm thereof. Both the terminals also are connected to inputs to a differential voltage detector DVD. The detector DVD is connected to a filter circuit FC where the signal detected by the detector DVD is smoothed and given a quantity relating to time. The output from the filter circuit FC is applied to a signal converter SC where a signal corresponding to the difference in voltage between the motors or the output from the filter circuit FC is converted to the corresponding signal serving to decrease the magnitude to which the current flowing through the traction motors is limited as in the arrangement of FIG. 1. In other respects the arrangement is identical to that shown in FIG. 1.

While the invention has been described in terms of a slip occurring during acceleration it is to be understood that it is equally applicable to a slip occurring during deceleration.

In summary, the invention is operative to detect a slip and control a flow of current through the DC traction motors as a predetermined function of the detected slip whereby the current flowing the motors is controlled to a magnitude balancing the adhesion coefficient of the train in operation with the coefficient of friction between trains wheels and the associated rails utilized as much as possible.

The invention has several advantages. For example, the normal magnitude to which the current flowing through the DC traction motors is limited can be selected to be high because, upon the occurrence of a slip, the particular magnitude of current limitation continuously decreases in accordance with the corresponding slip speed to operate the train at a low magnitude of current limitation. This permits the traction force for each vehicle to increase. Therefore upon considering the electric vehicles as a whole, each vehicle having equipped thereon a traction motor or motors, that is, each motor vehicle can increase in output with the result that the driving power can be centralized. Therefore the number of the motor vehicles can decrease while their maintenance becomes easy.

Although the invention has been illustrated and described in conjunction with a few preferred embodiments thereof it is to be understood that various changes and modifications may be resorted to without departing from the spirit and scope of the invention. For example, instead of the voltage detectors $VD_1$ and $VD_2$, other detectors may be used to detect a difference in the number revolution between the traction motors or the wheels of the electric vehicles with satisfactory results.

What is claimed is:

1. A control system for use with a train of electric vehicles comprising, in combination, a plurality of direct current traction motors serially connected to one another and divided into two motor groups, one detection means operatively coupled to each of said two motor groups to detect a voltage developed across that motor group, comparison means connected to said detection means to compare an output from one of said detection means with that from the other detection means, thereby to produce an output in the form of a predetermined function in accordance with a difference between the compared outputs, a current detector means for detecting a current flowing through said traction motors, a current pattern control means for determining the normal current flowing through the traction motors, power converter means connected in series with said traction motors to control the current flowing through said traction motors, and adjusting means having the output from said comparison means, the output from said current detector means and said current pattern applied as inputs thereto, said adjusting means being operative normally to control said power converter means in accordance with said current pattern, and being responsive to the occurrence of a slip between said traction motors to control said power converter means so as to cause said adjusting means to decrease the current flowing through said traction motors in accordance with the output from said comparison means.

2. A control system according to claim 1, in which said detection means comprises a voltage detector connected across each said motor group and said comparison means comprises a comparison amplifier having input leads connected respectively to said voltage detectors and an output lead connected to said adjusting means.

3. A control system according to claim 1, in which said detection means comprises two resistors connected in series with one another across said two groups of motors to constitute a Wheatstone bridge and said comparison means comprises differential voltage detector means having one input lead connected between said groups of motors and a second input lead connected between said resistors.

* * * * *